United States Patent
Zhao

(10) Patent No.: US 12,489,584 B2
(45) Date of Patent: Dec. 2, 2025

(54) METHOD FOR CONFIGURING SIDELINK FEEDBACK RESOURCE, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Zhenshan Zhao, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 449 days.

(21) Appl. No.: 18/055,179

(22) Filed: Nov. 14, 2022

(65) Prior Publication Data

US 2023/0069882 A1    Mar. 9, 2023

Related U.S. Application Data

(63) Continuation of application No. PCT/CN2020/091671, filed on May 21, 2020.

(51) Int. Cl.
*H04L 5/00* (2006.01)
*H04W 72/20* (2023.01)
*H04L 1/1607* (2023.01)

(52) U.S. Cl.
CPC ........... *H04L 5/0053* (2013.01); *H04W 72/20* (2023.01)

(58) Field of Classification Search
CPC ... H04L 5/0053; H04L 5/0094; H04L 1/1671; H04W 72/20
See application file for complete search history.

(56) References Cited

U.S. PATENT DOCUMENTS

| 2020/0099479 | A1 | 3/2020 | Park | |
|---|---|---|---|---|
| 2020/0228247 | A1* | 7/2020 | Guo | H04L 1/0025 |
| 2020/0313804 | A1* | 10/2020 | Ryu | H04L 5/0055 |
| 2020/0351057 | A1* | 11/2020 | Yeo | H04L 1/1854 |
| 2022/0094481 | A1* | 3/2022 | Hong | H04L 1/1812 |

FOREIGN PATENT DOCUMENTS

| CN | 11054533 | * 12/2019 | H04W 4/40 |
|---|---|---|---|
| CN | 110545533 | * 12/2019 | H04W 4/40 |
| CN | 110677883 | 1/2020 | |

(Continued)

OTHER PUBLICATIONS

3GPP TSG RAN WG1#97, R1-1906727 Title: Discussion on time-freq-Domain enhancement for RACH respources (Year: 2019).*

(Continued)

*Primary Examiner* — Faruk Hamza
*Assistant Examiner* — Abusayeed M Haque
(74) *Attorney, Agent, or Firm* — Hodgson Russ LLP

(57) ABSTRACT

A method for configuring a sidelink (SL) feedback resource is provided. The method includes the following. A first terminal device obtains resource pool configuration information, where the resource pool configuration information includes resource pool indication information of a transmission resource of a SL data channel and resource pool indication information of a transmission resource of a SL feedback channel. The SL data channel is for transmitting first SL data, and the SL feedback channel includes a first-type SL feedback channel and a second-type SL feedback channel.

18 Claims, 8 Drawing Sheets

(56) References Cited

FOREIGN PATENT DOCUMENTS

| | | |
|---|---|---|
| CN | 110943809 | 3/2020 |
| WO | 2020029558 | 2/2020 |

OTHER PUBLICATIONS

3GPP TSG RAN WG1#97, R1-1906927 Title: Discussion on time-freq-Domain enhancement for RACH respources (Year: 2019).*
3GPP TSG RAN WG1#96bis, R1-1905421 Title:NR sidelink Physical layer Structure.*
Sharp, "Remaining issues on physical layer procedures for NR sidelink," 3GPP TSG RAN WG1 Meeting #100bis-e, R1-2002390, Apr. 2020.
WIPO, International Search Report and Written Opinion for International Application No. PCT/CN2020/091671, Feb. 22, 2021.
Interdigital Inc., "Physical Layer Procedures for NR V2X Sidelink," 3GPP TSG RAN WG1 Ad-Hoc Meeting 1901, R1-1900794, Jan. 2019.
LG Electronics, "Updated feature lead summary for agenda item 7.2.4.1.2 Physical layer procedures," 3GPP TSG RAN WG1 Meeting #95, R1-1814265, Nov. 2018.
Qualcomm Incorporated, "Physical Layer Procedures for Sidelink," 3GPP TSG RAN WG1 Meeting #98bis, R1-1911110, Oct. 2019.
OPPO, "Physical layer procedure for NR-V2X sidelink," 3GPP TSG RAN WG1 #98bis, R1-1910375, Oct. 2019.
EPO, Extended European Search Report for EP Application No. 20936577.4, May 11, 2023.

* cited by examiner

S101

A first terminal device obtains resource pool configuration information, where the resource pool configuration information includes resource pool indication information of a transmission resource of a SL data channel and resource pool indication information of a transmission resource of a SL feedback channel. The SL data channel is for transmitting first SL data, and the SL feedback channel includes a first-type SL feedback channel and a second-type SL feedback channel

A first communication device transmits resource pool configuration information to a first terminal device, where the resource pool configuration information includes resource pool indication information of a transmission resource of a SL data channel and resource pool indication information of a transmission resource of a SL feedback channel. The SL data channel is for transmitting first SL data, and the SL feedback channel includes a first-type SL feedback channel and a second-type SL feedback channel

FIG. 9

METHOD FOR CONFIGURING SIDELINK FEEDBACK RESOURCE, TERMINAL DEVICE, AND NETWORK DEVICE

CROSS-REFERENCE TO RELATED APPLICATION(S)

This application is a continuation of International Application No. PCT/CN2020/091671, filed May 21, 2020, the entire disclosure of which is incorporated herein by reference.

TECHNICAL FIELD

This application relates to the field of communication, and in particular to a method for configuring a sidelink feedback resource, a terminal device, and a network device.

BACKGROUND

Device to Device (D2D) and Vehicle to Everything (V2X, also known as Internet of Vehicles) technologies are important parts of mobile communications. In D2D or V2X scenarios, direct communication between devices are supported through sidelink (SL) transmission technologies. Generally, "sidelink" refers to a communication link between terminals. The link between terminals can be applied to communication nodes in any scenario, such as in-vehicle scenario, home scenario, etc., where communication nodes do not require network coverage. Therefore, compared to an uplink or downlink in a cellular system where data transmission is done through a base station, the SL transmission allows higher spectral efficiency and lower transmission latency. The V2X system supports two transmission modes. In transmission mode 1, transmission resources of a terminal are allocated by the base station, and the terminal transmits SL data on SL according to the resources allocated by the base station. In transmission mode 2, the terminal selects resources in a resource pool for SL transmission.

With continuous evolution of the next-generation mobile communication new radio (5G NR) system, especially the development of autonomous driving technology, higher requirements such as higher throughput, lower latency, higher reliability, larger coverage, and more flexible resource allocation, are placed on SL data interaction between multiple terminals in the V2X system. In NR-V2X system, in order to improve transmission reliability, a physical sidelink feedback channel (PSFCH) is introduced. A transmitting terminal transmits SL data to a receiving terminal, and the receiving terminal transmits SL feedback information to the transmitting terminal, where the SL feedback information is carried in the PSFCH. The transmitting terminal then determines whether to retransmit the SL data according to the SL feedback information.

Currently, the NR-V2X system only supports one PSFCH format for the PSFCH, and the PSFCH format only supports carrying SL feedback information of one bit. With the evolution of technology, this PSFCH format can no longer satisfy the requirements for SL data transmission.

SUMMARY

In a first aspect, a method for configuring a SL feedback resource is provided in implementations of the disclosure. The method includes that a first terminal device obtains resource pool configuration information, where the resource pool configuration information includes resource pool indication information of a transmission resource of a SL data channel and resource pool indication information of a transmission resource of a SL feedback channel. The SL data channel is for transmitting first SL data, and the SL feedback channel includes a first-type SL feedback channel and a second-type SL feedback channel.

In a second aspect, a method for configuring a SL feedback resource is provided in implementations of the disclosure. The method includes that a communication device transmits resource pool configuration information to a first terminal device, where the resource pool configuration information includes resource pool indication information of a transmission resource of a SL data channel and resource pool indication information of a transmission resource of a SL feedback channel. The SL data channel is for transmitting first SL data, and the SL feedback channel includes a first-type SL feedback channel and a second-type SL feedback channel.

In a third aspect, a terminal device is further provided in implementations of the disclosure. The terminal device includes a processor and a memory for storing a computer program. The processor is configured to invoke and run the computer program stored in the memory to carry out any of the method above.

BRIEF DESCRIPTION OF THE DRAWINGS

FIG. 8 is a schematic flowchart of a method for configuring a SL feedback resource in implementations of the disclosure.

FIG. 9 is a schematic flowchart of a method for configuring a SL feedback resource in other implementations of the disclosure.

DETAILED DESCRIPTION

Figure 1:
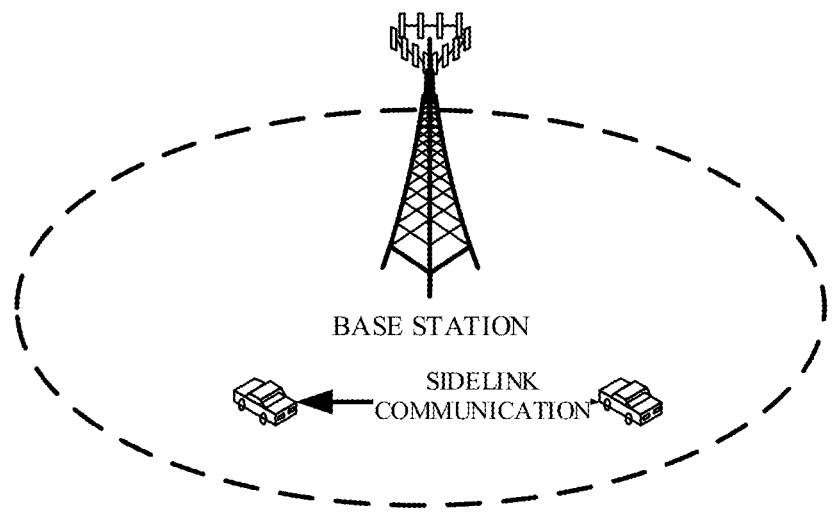
FIG. 1 is a schematic effect diagram of a SL communication system within network coverage.

The technical solutions in implementations of the disclosure will be described below with reference to accompanying drawings in the implementations of the disclosure.

The technical solutions of implementations of the disclosure can be applied to various communication systems, for example, a global system of mobile communication (GSM) system, a code division multiple access (CDMA) system, a wideband code division multiple access (WCDMA) system, general packet radio service (GPRS), long term evolution (LTE) system, advanced long term evolution (LTE-A) system, new radio (NR) system, evolution of NR system, LTE-based access to unlicensed spectrum (LTE-U) system, NR-based access to unlicensed spectrum (NR-U) system, non-terrestrial networks (NTN) system, universal mobile telecommunication system (UMTS), wireless local area networks (WLAN), wireless fidelity (Wi-Fi), fifth-generation communication (5th-Generation, 5G) system, or other communication systems.

Generally, a traditional communication system supports a limited number of connections and is easy to implement. However, with the development of communication technology, mobile communication systems will not only support traditional communication, but also support, for example, device to device (D2D) communication, machine-to-machine (M2M) communication, machine-type communication (MTC), vehicle-to-vehicle (V2V) communication, or vehicle to everything (V2X) communication, etc. Implementations of the disclosure can also be applied to these communication systems.

Optionally, the communication system in implementations of the disclosure may be applied to a carrier aggregation (CA) scenario, a dual connectivity (DC) scenario, or a standalone (SA) deployment scenario.

Implementations of this disclosure describe various implementations in conjunction with network device and terminal device, where the terminal device may also be referred to as user equipment (UE), access terminal, subscriber unit, subscriber station, mobile station, remote station, remote terminal, mobile device, user terminal, terminal, wireless communication device, user agent, user device, etc.

The terminal device may be a station (ST) in WLAN, and may be a cellular phone, a cordless phone, a session initiation protocol (SIP) phone, a wireless local loop (WLL) station, a personal digital assistant (PDA) device, a handheld device capable of wireless communication, a computing device, or other processing devices connected to wireless modems, an in-vehicle device, a wearable device, a terminal device in a next-generation communication system such as NR network, or future terminal equipment in an evolved public land mobile network (PLMN) network, etc.

In implementations of the disclosure, the terminal device can be deployed on land, including indoor or outdoor, handheld, wearable, or in-vehicle. The terminal device can also be deployed on water (such as ships, etc.) or in the air (such as on airplanes, balloons, and satellites).

In implementations of the disclosure, the terminal device may be a mobile phone, a tablet computer (Pad), a computer with a wireless transceiver function, a virtual reality (VR) terminal device, an augmented reality (AR) terminal device, a wireless terminal device in industrial control, a wireless terminal device in self driving, a wireless terminal device in remote medical, a wireless terminal device in smart grid, a wireless terminal device in transportation safety, a wireless terminal device in smart city, or a wireless terminal device in smart home, etc.

As an example but not a limitation, in implementations of the disclosure, the terminal device may also be a wearable device. The wearable device can also be called wearable smart device, which is a general term for wearable devices smartly designed and developed for daily wear using wearable technology, such as glasses, gloves, watches, clothing and shoes. The wearable device is a portable device that is worn directly on the body or integrated into the user's clothing or accessories. The wearable device is not only a hardware device, but also can realize powerful functions through software support, data interaction, and cloud interaction. In a broad sense, the wearable smart device includes full-featured, large-scale devices that can realize complete or partial functions without relying on smart phones, such as smart watches or smart glasses, and includes devices that only focus on a certain type of application function and need to cooperate with other devices such as smart phones, such as all kinds of smart bracelets, smart jewelry, etc. for physical sign monitoring.

In implementations of the disclosure, the network device may be a device for communicating with mobile devices, and the network device may be an access point (AP) in WLAN, a base transceiver station (BTS) in GSM or CDMA, a NodeB (NB) in WCDMA, an evolved Node B (eNB or eNodeB) in LTE, a relay station or access point, an in-vehicle device, a wearable device, a network equipment (gNB) in NR network, a network equipment in a future evolved PLMN network, etc.

As an example but not a limitation, in implementations of the disclosure, the network device may have a mobility feature, for example, the network device may be a mobile device. Optionally, the network device may be a satellite or a balloon station. For example, the satellite may be a low earth orbit (LEO) satellite, a medium earth orbit (MEO) satellite, a geostationary earth orbit (GEO) satellite, a high elliptical orbit (HEO) satellite, etc. Optionally, the network device may also be a base station disposed in a location such as land or water.

In implementations of the disclosure, the network device may provide services for a cell, and the terminal device communicates with the network device through transmission resources (for example, frequency-domain resources, or called spectrum resources) used by the cell, where the cell may be corresponding to the network device (such as base station). The cell may belong to a macro base station, or may belong to a Small cell. The Small cell herein may include a Metro cell, a Micro cell, a Pico cell, a Femto cell, etc. The Small cell has characteristics of small coverage and low transmit power, and is suitable for providing high-speed data transmission services.

It should be understood that the terms "system" and "network" are often used interchangeably herein. The term "and/or" herein is used to describe an association relationship of associated objects, which means, for example, there can be three relationships between the associated objects, for example, A and/or B can mean A alone exists, A and B exist simultaneously, and A alone exists. The character "/" herein generally indicates that the related objects are in a "or" relationship.

In order to clearly illustrate the idea of the implementations of the disclosure, the related content of sidelink (SL) communication is briefly described first.

Figure 2:
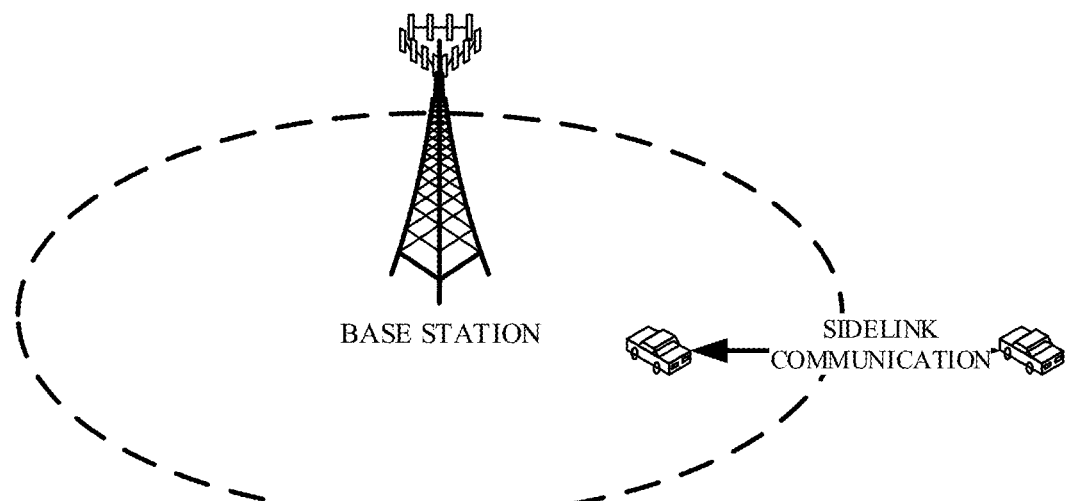
FIG. 2 is a schematic effect diagram of a SL communication system partially within network coverage.
Figure 3:
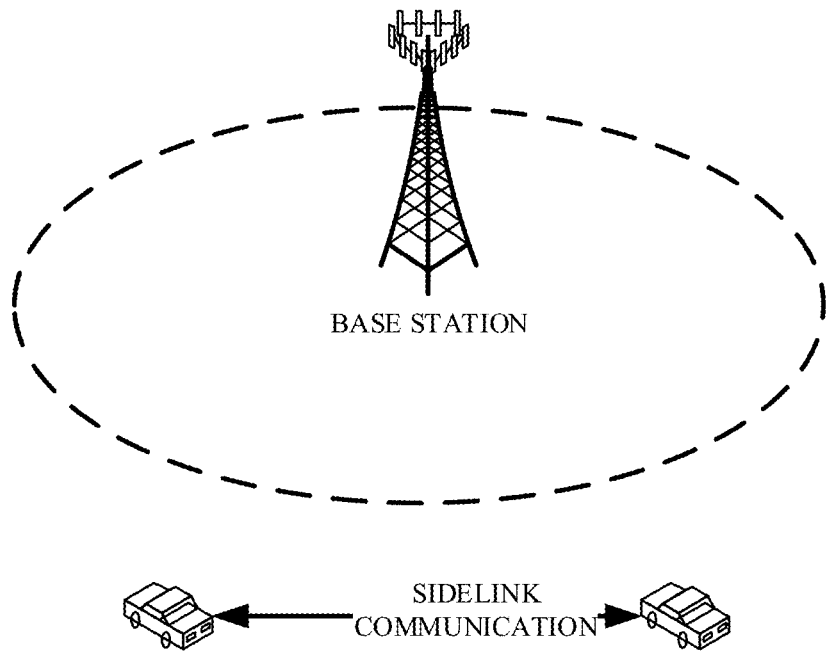
FIG. 3 is a schematic effect diagram of a SL communication system out of network coverage.

According to network coverage at the communicating terminal(s), SL communication may include SL communication within network coverage, SL communication partially within network coverage, and SL communication out of network coverage, which are illustrated in FIG. 1, FIG. 2, and FIG. 3 respectively.

Referring to FIG. 1, for SL communication within network coverage, all terminals in SL communication are within coverage of a same base station. Therefore, the terminals can receive configuration signaling from the base station and perform SL communication based on a same SL configuration.

Referring FIG. 2, for SL communication partially within network coverage, some terminals in SL communication are within coverage of a base station, while other terminals in SL communication are out of coverage of the base station. The terminals within coverage of the base station can receive configuration signaling from the base station and perform SL communication according to the configuration from the base station. The terminals out of coverage of the base station cannot receive the configuration signaling from the base station. In this case, the terminals out of coverage of the base station will determine SL configuration for SL communication according to pre-configuration information and information carried in a physical sidelink broadcast channel (PSBCH) transmitted from the terminals within network coverage.

Referring to FIG. 3, for SL communication out of network coverage, all terminals in SL communication are out of coverage of the network. Therefore, the terminals determine SL configuration for SL communication according to pre-configuration information.

Figure 4:
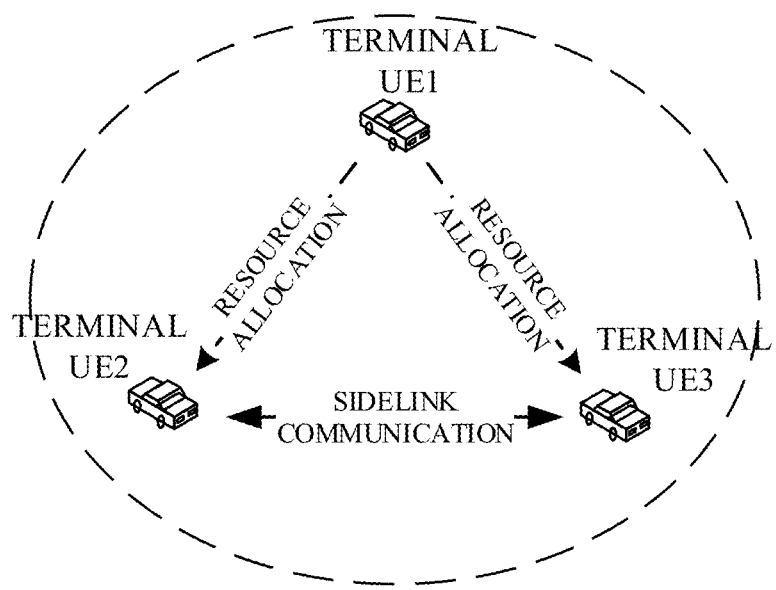
FIG. 4 is a schematic diagram of multiple terminals in a communication group.

Referring to FIG. 4, for SL communication with a central control node, multiple terminals forms a communication group. The communication group has a central control node, also referred to as cluster header (CH). As illustrated in FIG. 4, UE1 is the central control node. The central control node has functions including: establishing a communication group, adding or removing a group member(s), coordinating resources, allocating SL transmission resources for other terminals, receiving SL feedback information from other terminals, coordinating resources with another communication group, etc.

Figure 5:
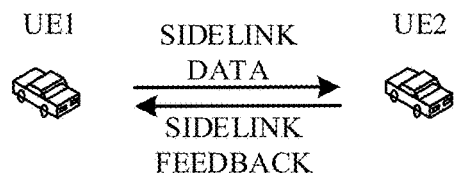
FIG. 5 is a schematic diagram illustrating SL transmission between a transmitting terminal and a receiving terminal in NR-V2X.

Referring to FIG. 5, SL feedback channel is introduced in NR-V2X. SL feedback information is carried in the SL feedback channel, such as a physical sidelink feedback channel (PSFCH). The PSFCH may carry hybrid automatic repeat request (HARQ) feedback information of one bit.

Figure 6:
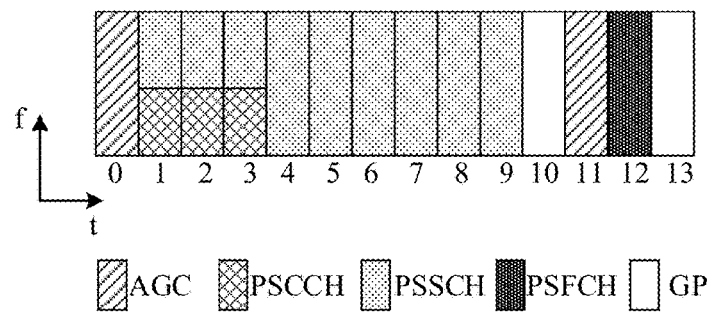
FIG. 6 is a schematic diagram illustrating locations of time-domain symbols of SL data in a slot.

FIG. 6 illustrates exemplarily locations of time-domain symbols occupied by PSFCH, physical sidelink control channel (PSCCH), and physical sidelink shared channel (PSSCH) respectively in a slot. Referring to FIG. 6, in a slot, the last symbol is used as guard period (GP). The last second symbol is used for PSFCH transmission. The last third symbol carries same data as the PSFCH symbol for automatic gain control (AGC). The last fourth symbol is also used as GP. The first symbol in the slot is used for AGC and carries same data as the second symbol in the slot. The PSCCH occupies three time-domain symbols. The remaining symbols may be used for PSSCH transmission.

In other words, PSFCH occupies two time-domain symbols in time domain, where the second symbol of the two time-domain symbols carries SL feedback information, and data on the first symbol is a duplication of data on the second symbol. The first symbol is used as AGC. The PSFCH occupied one PRB in frequency domain.

Figure 7:
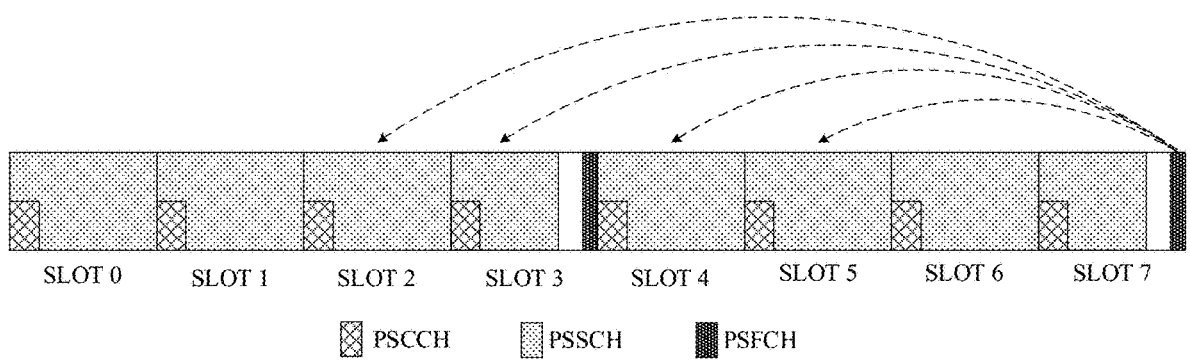
FIG. 7 is a schematic diagram illustrating PSFCH distribution in slots.

Further, in order to reduce overhead of PSFCH, it is defined that one slot of every N slots includes transmission resources of the PSFCH, that is, the SL feedback resources have a period of N slots, where N=1, 2 or 4. Parameter N may be pre-configured or configured by a network. FIG. 7 is schematic diagram illustrating PSFCH distribution in slots when N=4. In this case, feedback information for PSSCHs transmitted in slot 2, slot 3, slot 4, and slot 5 are transmitted in slot 7. Therefore, slots {2, 3, 4, 5} may be regarded as a slot set, and PSFCHs corresponding to each PSSCH transmitted in this slot set are in a same slot.

In practical application, the format and period of the SL feedback channel illustrated in FIG. 6 and FIG. 7 limit the size and type of feedback information that the receiving terminal can transmit to the transmitting terminal. In addition, if SL transmission is performed on the unlicensed spectrum, according to specifications, a bandwidth occupied by a channel should be greater than or equal to 80% of the system bandwidth. However, the current SL feedback channel only occupies one PRB, which is difficult to be applied to unlicensed spectrum. As a result, the current SL feedback channel needs to be enhanced.

Before describing the technical solutions of implementations of the disclosure, some scenarios or systems to which the implementations of the disclosure can be applied are first provided.

1. V2X System

Multiple vehicles can form a communication group, and a CH can allocate transmission resources to other terminals in the group. When two communication groups are relatively close, interference coordination between the two communication groups needs to be considered.

2. Home or Indoor Scenario

In smart home scenarios, terminals at home or indoor have communication functions, and multiple terminals at home can form a communication group. The communication group usually has a central control node or a CH, such as a smart phone, a smart TV, and a consumer premise equipment (CPE). Terminals at a same home form a communication group, and different homes have different communication groups. Interference coordination between a communication group of one home and a communication group of another home (such as neighbors) needs to be considered.

3. In-Vehicle Communication Scenario

A variety of terminal devices can be installed in a vehicle, such as speakers, audio, cameras, rearview mirrors, etc. These terminal devices can be controlled by a central control node in the vehicle. Terminals in the vehicle form a communication group or communication system, and different vehicles have different communication groups. When the vehicle moves to the vicinity of another vehicle, interference coordination between vehicles needs to be considered.

In the above scenarios or systems, the size and type of feedback information that the receiving terminal can send to the transmitting terminal during SL transmission are limited.

In order to improve the SL feedback channel, implementations of the disclosure provide a method for configuring a SL feedback resource. Referring to FIG. 8, the method includes the following.

At S101, a first terminal device obtains resource pool configuration information, where the resource pool configuration information includes resource pool indication information of a transmission resource of a SL data channel and resource pool indication information of a transmission resource of a SL feedback channel. The SL data channel is for transmitting first SL data, and the SL feedback channel includes a first-type SL feedback channel and a second-type SL feedback channel.

According to the implementations of the disclosure, the SL feedback channel includes the first-type SL feedback channel and the second-type SL feedback channel. With the resource pool configuration information, the terminal device can not only obtain the transmission resource information of the SL data channel, but also the transmission resource information of the SL feedback channel. Therefore, the terminal device can transmit the SL feedback information through an appropriate SL feedback channel (for example, the first-type SL feedback channel or the second-type SL feedback channel), so as to avoid that the SL feedback information cannot be transmitted due to inappropriate SL feedback channel format.

In implementations of the disclosure, optionally, the first terminal device may obtain the resource pool configuration information pre-configured, configured by a network, or configured by other terminals (such as a CH or a transmitting terminal).

Correspondingly, a method for configuring a SL feedback resource is provided in implementations of the disclosure. Referring to FIG. 9, the method includes the following.

At S201, a first communication device transmits resource pool configuration information to a first terminal device, where the resource pool configuration information includes resource pool indication information of a transmission resource of a SL data channel and resource pool indication information of a transmission resource of a SL feedback channel. The SL data channel is for transmitting first SL data, and the SL feedback channel includes a first-type SL feedback channel and a second-type SL feedback channel.

In implementations of the disclosure, optionally, the first communication device may be a network device, a CH of the first terminal device, or a transmitting terminal, which can achieve the objective of the implementations of the disclosure.

In implementations of the disclosure, optionally, the resource pool indication information of the transmission resource of the SL feedback channel includes first SL feedback resource pool indication information. The first SL feedback resource pool indication information is used for determining a transmission resource of the first-type SL feedback channel. The first-type SL feedback channel is associated with the first SL data.

In implementations of the disclosure, optionally, the resource pool indication information of the transmission resource of the SL feedback channel includes second SL feedback resource pool indication information. The second SL feedback resource pool indication information is used for determining a transmission resource of the second-type SL feedback channel. The second-type SL feedback channel is associated with the first SL data. Optionally, the second SL feedback resource pool indication information may be a same type of resource pool indication information as the first SL feedback resource pool indication information.

As can be seen, the first-type SL feedback channel and the second-type SL feedback channel can be used for transmitting the SL feedback information corresponding to the first SL data. According to an attribute of the SL feedback information (such as a number of bits or information type), the first terminal device may perform transmission using the first-type SL feedback channel or the second-type SL feedback channel. Optionally, the first SL data may include a physical sidelink control channel (PSCCH) and/or a physical sidelink shared channel (PSSCH).

In the following, the first-type SL feedback channel, the second-type SL feedback channel, and corresponding indication information will be described in detail.

First-Type SL Feedback Channel

In implementations of the disclosure, the first-type SL feedback channel is a first-type PSFCH, which has at least one of the following characteristics.

Optionally, the first-type PSFCH occupies two time-domain symbols in time domain. Optionally, the two time-domain symbols carry same data, that is, data on one symbol is a repetition of data on the other symbol.

Optionally, a time-domain symbol before and/or after the two time-domain symbols occupied by the first-type PSFCH is a guard period (GP).

Optionally, the first-type PSFCH occupies multiple resource blocks (RBs) in frequency domain. For example, the first-type PSFCH occupies K1 RBs in frequency domain, where K1 is an integer greater than one.

Optionally, the multiple RBs are consecutive.

Optionally, the multiple RBs are contained in an interlace.

Optionally, at least one or each of the multiple RBs includes a resource element (RE) for carrying the first-type PSFCH and an RE for transmitting a demodulation reference signal (DMRS).

For example, after channel coding such as polar coding, the SL feedback information corresponding to the first SL data are carried by the first-type PSFCH. As an example, FIG. 10 is a schematic diagram illustrating a configuration with interlaced resource blocks (IRBs) in implementations of the disclosure.

Figure 10:
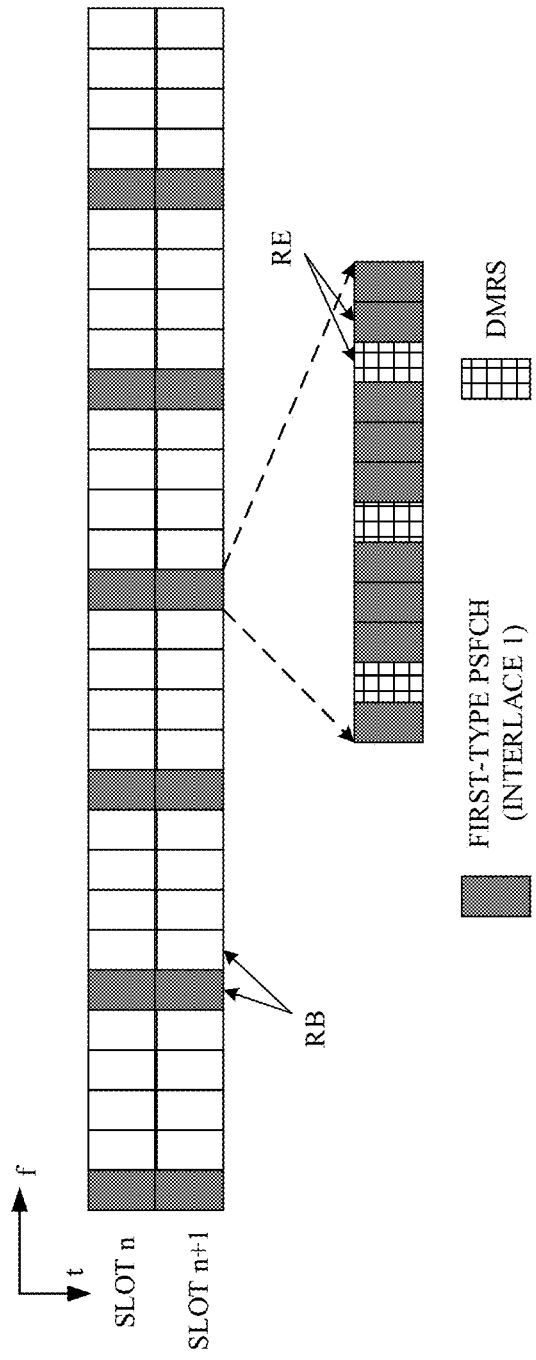
FIG. 10 is a schematic diagram illustrating distribution of interlaced resource blocks (IRBs) of a first-type PSFCH in implementations of the disclosure.

Referring to FIG. 10, 30 RBs are contained in a system bandwidth, and the 30 RBs include 5 interlaces (where the first-type PSFCHs occupy interlace 1). Each interlace includes 6 RBs. In one interlace, every two adjacent RBs have a same spacing in frequency domain (spaced 5 RBs).

The first-type PSFCHs occupy two time-domain symbols, and each symbol occupies RBs in one interlace. Each interlace contains 6 RBs.

In each RB for the first-type PSFCH, 3 DMRS REs are for carrying the DMRS, and remaining REs are for carrying the first-type PSFCH.

Data on the two time-domain symbols for the first-type PSFCH are the same. That is, data (including DMRS) on one symbol is a repetition of data (including DMRS) on the other symbol.

In implementations of the disclosure, resources for the first-type PSFCH can be configured through interlace, so that a band range occupied by the terminal may be greater than or equal to 80% of the system bandwidth, which conforms to regulation of communication on unlicensed spectrum. In this way, the terminal may perform SL transmission on the unlicensed spectrum.

Optionally, the first-type PSFCH is for carrying at least one of the following information:

hybrid automatic repeat request-acknowledgement (HARQ-ACK) information,
channel quality indicator (CQI) information,
rank indicator (RI) information,
pre-coding matrix indicator (PMI) information,
beam information,
reference signal index information,
power adjustment information, or
measurement information.

The reference signal index information may include an index for channel state information reference signal (CSI-RS) or an index for a synchronization signal block (SSB).

The measurement information may include reference signal receiving power (RSRP), received signal strength indication (RSSI), reference signal receiving quality (RSRQ), or signal to interference plus noise ratio (SINR), etc.

Second-Type SL Feedback Channel

In implementations of the disclosure, the second-type SL feedback channel is a second-type PSFCH, which has at least one of the following characteristics.

Optionally, the second-type PSFCH occupies two time-domain symbols in time domain. Optionally, the two time-domain symbols carry same data, that is, data on one symbol is a repetition of data on the other symbol.

Optionally, a time-domain symbol before and/or a time-domain symbol after the two time-domain symbols occupied by the second-type PSFCH is a guard period (GP).

Optionally, the second-type PSFCH includes a first sequence. Optionally, the second-type PSFCH is the first sequence. The SL feedback information is carried by the first sequence. For example, the first sequence can be determined according to the SL feedback information. For another example, the first sequence can be generated according to the SL feedback information.

Optionally, the second-type PSFCH occupies one or more RBs in frequency domain. For example, the second-type PSFCH occupies K2 RBs, where K2 is an integer greater than or equal to one.

Optionally, the first sequence of the second-type PSFCH occupies one physical resource block (PRB). If the second-type PSFCH occupies K2 RBs, at least one or each RB of the K2 RBs carries the same sequence, that is, the first sequence.

For example, the second-type PSFCH may carry HARQ-ACK information of one bit. A sequence may be generated according to the HARQ-ACK information (ACK or NACK). Assume that the sequence generated has a length of 12 points. The sequence is mapped to each of the K2 RBs, which means that each of the K2 RBs is mapped with the same sequence.

Optionally, the first sequence of the second-type PSFCH occupies the K2 RBs. That is, the length of the first sequence is determined according to the number of subcarriers or REs corresponding to the K2 RBs.

For example, the second-type PSFCH occupies 2 RBs and each RB includes 12 subcarriers. In other words, the second-type PSFCH occupies 24 subcarriers. The first sequence is generated according to the number of the subcarriers. For instance, the generated sequence has a length of 24 points and is mapped to the 24 subcarriers. For another instance, the sequence is generated according to the largest prime number less than 24 (i.e. 23), that is, the generated sequence has a length of 23 points. Then the sequence is mapped to the 24 subcarriers, that is, the sequence is mapped to the first to $23^{th}$ subcarriers and data on the $24^{th}$ subcarrier is the same as data on the first subcarrier.

The features of the two SL feedback channels defined in the implementations of the disclosure, namely the first-type PSFCH and the second-type PSFCH, are briefly described above. In the following, resource pool indication information of transmission resources of the two types of SL feedback channels is introduced in detail.

Resource Pool Indication Information of Transmission Resources of SL Feedback Channel In implementations of the disclosure, the resource pool indication information of transmission resources of the SL feedback channel can be used for configuring a transmission resource of the first-type PSFCH as well as a transmission resource of the second-type PSFCH. Therefore, unless otherwise specified, the SL feedback channel (PSFCH) mentioned in the following may be the first-type PSFCH or the second-type PSFCH.

In implementations of the disclosure, optionally, the resource pool indication information of the transmission resource of the SL feedback channel includes time-domain period information of the SL feedback channel.

For example, in this indication information, a parameter indicating the time-domain period of the PSFCH is P, where P is an integer greater than or equal to one. In other words, there is one slot available for transmitting the PSFCH in every P slots. The parameter may be represented by the number of available logical slots. It should be understood that the logical slots represent slots available for a resource pool, or slots belonging to a certain resource pool.

In implementations of the disclosure, optionally, the resource pool indication information of the transmission resource of the SL feedback channel includes first indication information. The first indication information is used for determining a time-domain resource corresponding to a transmission resource of the first SL feedback channel within a system frame number (SFN) period or a direct frame number (DFN) period. Optionally, the time-domain resource corresponding to the transmission resource of the first SL feedback channel within the SFN period or DFN period may be pre-configured or pre-defined. For example, the period of the SL feedback channel is P=4, and the first SL feedback channel within one SFN period is the $4^{th}$ slot in the SFN period, that is, the slot indexed by 3 (if slots are indexed starting from 0).

In implementations of the disclosure, optionally, the resource pool indication information of the transmission resource of the SL feedback channel includes second indication information. The second indication information is used for determining the number of transmission resources of the SL feedback channel, where the number of the transmission resources of the SL feedback channel is greater than or equal to one.

In implementations of the disclosure, optionally, the resource pool indication information of the transmission resource of the SL feedback channel includes third indication information. The third indication information is used for determining the number of transmissions of the SL feedback channel, where the number of transmissions is greater than or equal to one.

Specifically, in current NR-V2X system, one PSSCH transmission corresponding to at least one PSFCH transmission resource in a slot. According to the PSSCH transmission resource, ID information, etc., the receiving terminal selects a PSFCH transmission resource from the at least one PSFCH transmission resource and transmits the PSFCH using the PSFCH transmission resource.

However, when the terminal operates on an unlicensed spectrum or a shared spectrum (for example, sharing the same spectrum with Wi-Fi users), the terminal needs to perform listen before talk (LBT) before transmission. Data transmission can only be performed if the LBT is successful. If the LBT is failed, transmission cannot be performed. Therefore, one PSSCH transmission resource can be configured to correspond to PSFCH transmission resources in one or more slots. As such, multiple transmission resources are allocated to the terminal, where the multiple transmission resources are in multiple slots.

In this way, with the implementations of the disclosure, the number of transmission resources of the SL feedback channel determined through the second indication information is greater than or equal to one, so that the receiving terminal may have multiple occasions to transmit the PSFCH in multiple slots, avoiding the problem that PSFCH cannot be transmitted due to LBT failure. Optionally, the terminal transmits the PSFCH only once in the multiple occasions.

Additionally, the number of transmissions of the SL feedback channel may be determined by the third indication information, where the number of transmissions is greater than or equal to one. In practical application, at least one successful transmission is enough.

Figure 11:
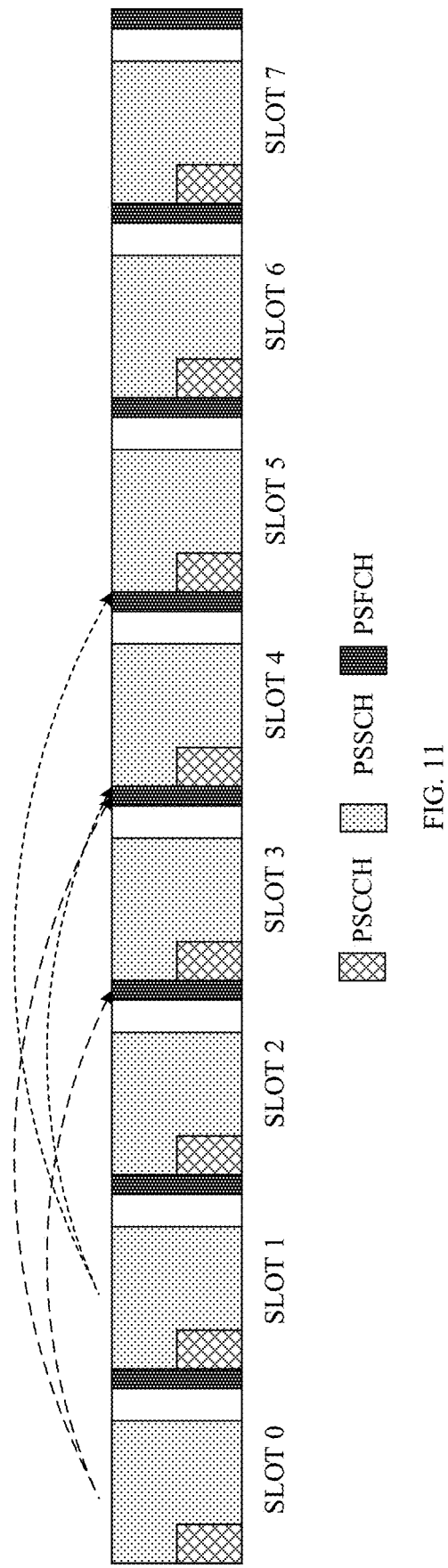
FIG. 11 is a schematic diagram of transmission resources of PSFCH in multiple slots in implementations of the disclosure.

More specifically, FIG. 11 illustrates PSFCH transmission resources in multiple slots in implementations of the disclosure. Each slot contains a transmission resource of the PSFCH. Specifically, the PSSCH transmitted in slot 0 corresponds to PSFCH transmission resources in slot 2 and slot 3 respectively, the PSSCH transmitted in slot 1 corresponds to PSFCH transmission resources in slot 3 and slot 4 respectively, and so on. Therefore, when the receiving terminal receives the PSSCH transmitted by other terminals in slot 0, the receiving terminal can transmit the corresponding PSFCH in slot 2 or slot 3. Specifically, the receiving terminal may perform LBT in slot 2, and if the LBT is successful, the PSFCH may be transmitted. In this case, the PSFCH for the PSSCH may not be transmitted in slot 3. If the LBT in slot 2 is failed, the LBT may be performed in slot 3, and if the LBT in slot 3 is successful, the PSFCH for the PSSCH may be transmitted in slot 3.

As can be seen, with the second indication information in the implementations of the disclosure, multiple PSFCH transmission occasions (in different time slots) for one PSSCH can be configured, which can improve the probability of successfully transmitting the PSFCH.

In implementations of the disclosure, optionally, the resource pool indication information of the transmission resource of the SL feedback channel includes frequency-domain resource indication information, and the frequency-domain resource indication information is used for determining a frequency-domain location and/or a frequency-domain size of the transmission resource of the SL feedback channel.

In implementations of the disclosure, optionally, the transmission resource of the SL feedback channel includes multiple resource subsets, and the frequency-domain resource indication information is used for determining frequency-domain locations and/or frequency-domain sizes of the multiple resource subsets.

For example, a resource set of the PSFCH transmission resources includes M resource subsets, and the frequency-domain resource indication information may be used to determine the frequency-domain locations and frequency-domain sizes of the M resource subsets. One PSSCH transmission may correspond to HPSFCH transmission occasions, and optionally the H PSFCH transmission occasions are in different PSFCH transmission slots, where M and H are integers greater than or equal to one.

Referring to FIG. 11, each PSFCH slot contains 2 PFSCH transmission subsets (that is, M=2), denoted as subset 1 and subset 2.

For example, PSSCH in slot 0 corresponds to a PSFCH transmission resource in PSFCH transmission subset 1 in slot 2, and a PSFCH transmission resource in PSFCH transmission subset 2 in slot 3.

Similarly, PSSCH in slot 1 corresponds to a PSFCH transmission resource in PSFCH transmission subset 1 in slot 3, and a PSFCH transmission resource in PSFCH transmission subset 2 in slot 4, and so on.

Optionally, in implementations of the disclosure, at least one PSFCH transmission resource in each PSFCH transmission resource subset may be determined according to the PSSCH transmission resource.

Optionally, a PSFCH transmission resource in the h-th PSFCH transmission resource subset in the H slots is determined according to the PSSCH transmission resource, where h is a positive integer.

For example, assuming M=4, that is, 4 PSFCH resource subsets are included in one PSFCH transmission slot, then one PSSCH may correspond to 4 PSFCH transmission resources in 4 PSFCH transmission slots. The period of the PSFCH transmission resources is 1 slot, that is, each slot contains PSFCH transmission resources. In this case, for the PSSCH transmitted in slot n, the corresponding 4 PSFCH transmission resources are:

one PSFCH resource in the $1^{st}$ PSFCH resource subset in slot n+k, one PSFCH resource in the $2^{nd}$ PSFCH resource subset in slot n+k+1, one PSFCH resource in the $3^{rd}$ PSFCH resource subset in slot n+k+2, and one PSFCH resource in the $4^{th}$ PSFCH resource subset in slot n+k+3 where k represents a slot interval between the PSFCH transmission slot and the corresponding PSSCH transmission slot.

In implementations of the disclosure, optionally, the frequency-domain resource indication information is used for determining a frequency-domain size of a single SL feedback channel. For example, the frequency-domain resource indication information may indicate the frequency-domain size of one first-type PSFCH or one second-type PSFCH. For example, the first-type PSFCH or the second-type PSFCH may include A RBs, B sub-bands, or C interlaces, where A, B, and C are all positive integers.

In implementations of the disclosure, optionally, the resource pool indication information of the transmission resource of the SL feedback channel includes code-domain resource indication information, and the code-domain resource indication information is used for determining: a number of SL feedback channels that can be multiplexed by code division multiplexing within a same time-frequency resource for SL feedback; and/or cyclic shift information of a sequence.

In implementations of the disclosure, since multiple PSFCH resource subsets are obtained by division, there may be a PSFCH transmission in each resource subset. Therefore, optionally, the resource pool indication information of the transmission resource of the SL feedback channel includes fourth indication information, the fourth indication information is used for determining a maximum number of PSFCHs that the terminal device can transmit simultaneously.

For example, in FIG. 7, the period of the PSFCH is four slots, and for each of the PSSCHs transmitted in slots 2, 3, 4, and 5, the PSFCH corresponding thereto is transmitted in slot 7. The maximum number of PSFCHs transmitted simultaneously can be configured, so that when the terminal transmits SL feedback channels in the resource pool, the number of SL feedback channels transmitted simultaneously does not exceed the maximum number. For example, the configured maximum number of SL feedback channels transmitted simultaneously is two. Terminal 1 transmits three PSSCHs to terminal 2 in slots 2, 3, and 4, respectively. The SL feedback channels corresponding to these three PSSCHs are all transmitted in slot 7. However, terminal 2 can transmit at most two SL feedback channels in slot 7. Optionally, terminal 2 transmits two PSSCHs with the highest priorities according to the priorities of the 3 PSSCHs.

Optionally, the first terminal device obtains fifth indication information, and determines, according to the fifth indication information, to transmit the SL feedback information using the first-type PSFCH or the second-type PSFCH. In the implementation of the disclosure, if both the first-type PSFCH and the second-type PSFCH are supported, the first terminal device may determine or indicate the type or format of the used PSFCH in various manners.

The first terminal device is for example a receiving terminal.

Manner 1: Determine a Format of the SL Feedback Channel According to Network Configuration Information or Pre-Configuration Information In implementations of the disclosure, the fifth indication information may be determined according to network configuration information or pre-configuration information. The fifth indication information may be carried by at least one of the following information: system information broadcast (SIB), radio resource control (RRC) signaling, or downlink control information (DCI).

For example, the receiving terminal receives the SIB, RRC signaling, DCI, etc. transmitted by the network device, and determines the format of the SL feedback channel according to the SIB, RRC, DCI, etc.

For example, in mode 1, the network dynamically allocates SL transmission resources to the terminal. The indication information of the format of the SL feedback channel may be included in the DCI carrying the resource allocation information. The network transmits the DCI to the transmitting terminal. The transmitting terminal obtains the indication information in the DCI and transmits to the receiving terminal the SCI carrying the indication information, where the indication information indicates the type or format of the PSFCH used by the receiving terminal for SL feedback.

Manner 2: Determine the Format of the SL Feedback Channel According to the CH or The Central Control Node The first terminal device receives configuration information transmitted by a second terminal device, where the configuration information includes the fifth indication information. The second terminal device may be a CH or a transmitting terminal.

For example, in a communication group, or a communication group with a central control node, the CH or the central control node may allocate transmission resources to group members. Optionally, the CH allocates transmission resources of SL data channels (including PSCCH and PSSCH) to the transmitting terminal, and the CH may also transmit the fifth indication information to the transmitting terminal to indicate the type of the SL feedback channel.

Optionally, the CH allocates transmission resources of SL data channels (including PSCCH and PSSCH) to the transmitting terminal, and transmits the indication information to the receiving terminal to indicate the type of the SL feedback channel.

Optionally, the CH transmits multicast information, where the multicast information includes SL feedback channel format indication information. Both the transmitting terminal and the receiving terminal can obtain the multicast information and determine the format of the SL feedback channel.

Optionally, the indication information for determining the format of the SL feedback channel is carried by SCI, PC5-RRC signaling, or a MAC CE, where the SCI may be first-stage SCI ($1^{st}$ SCI) or second-stage SCI ($2^{nd}$ SCI).

Regarding the two-stage SCI, in NR-V2X system, the $1^{st}$ SCI is carried in the PSCCH, which is used to transmit information for sensing of the receiving terminal, such as PSSCH transmission resources, priority information, reserved-resource indication information, modulation and coding scheme (MCS), DMRS pattern, number of antenna ports, etc. The $2^{nd}$ SCI is used for transmitting information for demodulating the PSSCH, such as HARQ process number, new data indicator (NDI), transmitter ID information, destination ID information, SL feedback indication information, etc. The $2^{nd}$ SCI is transmitted together with PSSCH and mapped around PSSCH DMRS symbols. The $2^{nd}$ SCI is demodulated according to PSSCH DMRS.

Manner 3: The Transmitting Terminal Determines the Format of the SL Feedback Channel Optionally, when transmitting SL data to the receiving terminal, the transmitting terminal may indicate the format of the SL feedback channel.

Optionally, indication information is carried in the SCI ($1^{st}$ SCI or $2^{nd}$ SCI) by the transmitting terminal, where the indication information is used to determine the format of the SL feedback channel.

Optionally, when the transmitting terminal and the receiving terminal establish a unicast link, the format of the SL feedback channel may be indicated through PC5-RRC signaling.

Manner 4: Determine the Format of the SL Feedback Channel According to the Size of the SL Feedback Information In implementations of the disclosure, the first-type PSFCH can carry SL feedback information of multiple bits, and the second-type PSFCH can carry SL feedback information of one bit. Therefore, the receiving terminal determines, according to the number of bits of the SL feedback information, to transmit SL feedback information using the first-type PSFCH or the second-type PSFCH.

For example, when the SL feedback information to-be-transmitted has one bit, the second-type PSFCH is used to transmit the SL feedback information, and when the SL feedback information has more than one bit, the first-type PSFCH is used to transmit the SL feedback information.

Manner 5: Determine the Format of the SL Feedback Channel According to the Type of the SL Feedback Information For example, when the SL feedback information is HARQ-ACK information, the second-type PSFCH is used to transmit the SL feedback information, and for non-HARQ-ACK information, the first-type PSFCH is used to transmit the SL feedback information. In implementations of the disclosure, the first-type PSFCH may carry content other than HARQ-ACK information, and may also carry HARQ-ACK information and/or other SL feedback information at the same time.

Manner 6: Determine According to the Resource Pool Configuration Information

If only resource pool information of one PSFCH format is configured in a PSSCH resource pool, the SL feedback information corresponding to the PSSCH transmitted in the resource pool is carried by this type of PSFCH. When the terminal transmits PSSCH in the resource pool, the receiving terminal feedbacks using the PSFCH format corresponding to the PSSCH resource pool.

As can be seen from the above description, the implementations of the disclosure define two PSFCH formats, namely the first-type PSFCH and the second-type PSFCH.

With the resource pool indication information, the PSSCH transmission resources can be associated with transmission resources of the first-type PSFCH and/or the second-type PSFCH. These two types of PSFCHs may carry different types and number of bits of feedback information. The applicable PSFCH format can be flexibly selected as needed to improve the probability of successful transmission of SL feedback information.

The specific configurations of the implementations of the disclosure have been described above through multiple implementations from different perspectives. Using at least one of the above implementations, the effect is described.

Figure 12:
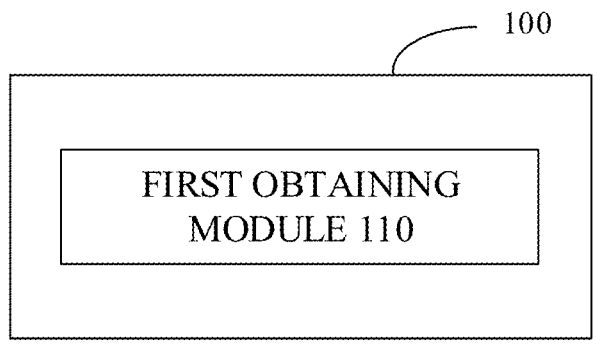
FIG. 12 is a schematic structural diagram of a first terminal device in implementations of the disclosure.

Corresponding to the processing method of at least one implementation above, implementations of the disclosure further provide a terminal device 100. Referring to FIG. 12, the terminal device 100 incudes a first obtaining module 110.

The first obtaining module 110 is configured to obtain resource pool configuration information, where the resource pool configuration information includes resource pool indication information of a transmission resource of a SL data channel and resource pool indication information of a transmission resource of a SL feedback channel. The SL data channel is for transmitting first SL data, and the SL feedback channel comprises a first-type SL feedback channel and a second-type SL feedback channel.

Corresponding to the processing method of at least one implementation above, implementations of the disclosure further provide a communication device. According to the implementations of the disclosure, the communication device may be a network device, a CH, or a transmitting terminal.

Figure 13:
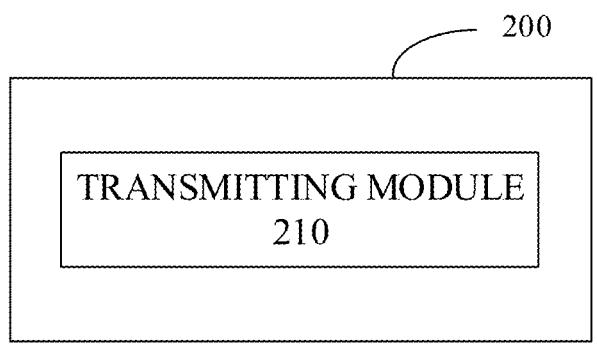
FIG. 13 is a schematic structural diagram of a network device in implementations of the disclosure.

FIG. 13 illustrates a network device 200 of implementations of the disclosure. The network device 200 includes a transmitting module 210.

The transmitting module 210 is configured to transmit resource pool configuration information to a first terminal device, where the resource pool configuration information includes resource pool indication information of a transmission resource of a SL data channel and resource pool indication information of a transmission resource of a SL feedback channel. The SL data channel is for transmitting first SL data, and the SL feedback channel comprises a first-type SL feedback channel and a second-type SL feedback channel.

Figure 14:
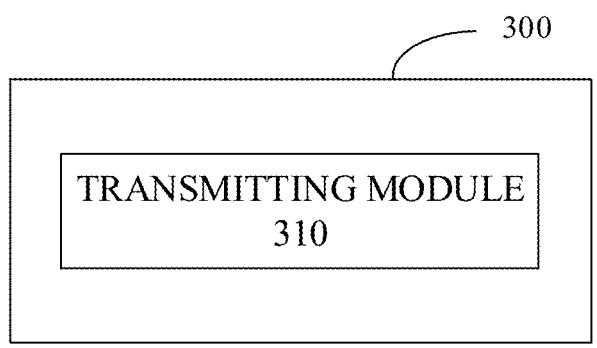
FIG. 14 is a schematic structural diagram of a second terminal device in implementations of the disclosure.

FIG. 14 illustrates a terminal device 300 of implementations of the disclosure. The terminal device 300 may be a CH of a transmitting terminal. The terminal device 300 includes a transmitting module 310.

The transmitting module 310 is configured to transmit resource pool configuration information to a first terminal device, where the resource pool configuration information includes resource pool indication information of a transmission resource of a SL data channel and resource pool indication information of a transmission resource of a SL feedback channel. The SL data channel is for transmitting first SL data, and the SL feedback channel comprises a first-type SL feedback channel and a second-type SL feedback channel.

The terminal device 100, the network device 200, and the terminal device 300 in the implementations of the disclosure can implement the corresponding functions of the terminal device in the foregoing method implementations, and For the processes, functions, implementations, and beneficial effects corresponding to each module (sub-module, unit, or component, etc.) in the terminal device 100, reference may be made to the corresponding descriptions in the foregoing method implementations, which will not be repeated herein.

It should be noted that the functions described for the various modules (sub-modules, units or components, etc.) in the terminal device 100, the network device 200, and the terminal device 300 in the implementations of the disclosure can be realized by different modules (sub-modules, units or components, etc.), or can also be realized by the same module (sub-module, unit or component, etc.). For example, the first transmitting module and the second transmitting module can be different modules or the same module, both of which can realize the corresponding functions of the terminal device of the implementations of the disclosure.

Figure 15:
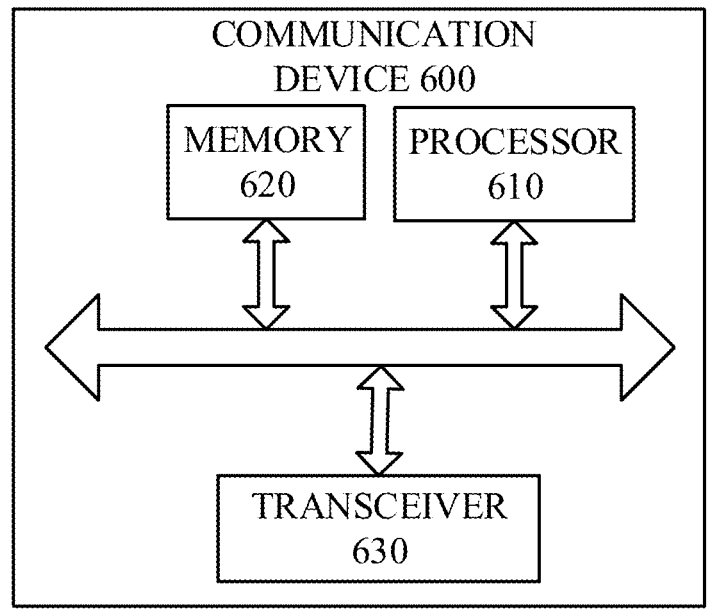
FIG. 15 is a schematic block diagram of a communication device in implementations of the disclosure.

FIG. 15 is a schematic structural diagram of a communication device 600 according to implementations of the disclosure. The communication device 600 includes a processor 610. The processor 610 may invoke and run a computer program from a memory to implement any of the methods in implementations of the disclosure.

Optionally, the communication device 600 may also include a memory 620. The processor 610 may invoke and run a computer program from the memory 620 to implement any of the methods in implementations of the disclosure.

The memory 620 may be a separate component independent of the processor 610, or may be integrated in the processor 610.

Optionally, the communication device 600 may further include a transceiver 630. The processor 610 may control the transceiver 630 to communicate with other devices, specifically, to transmit information or data to other devices, or to receive information or data from other devices.

The transceiver 630 may include a transmitter and a receiver. The transceiver 630 may further include one or more antennas.

Optionally, the communication device 600 may be the network device of the implementations of the disclosure, and the communication device 600 may implement the corresponding processes implemented by the network device in each method of the implementations of the disclosure, which is not repeated herein for brevity.

Optionally, the communication device 600 may be a terminal device in the implementations of the disclosure, and the communication device 600 may implement corresponding processes implemented by the terminal device in each method in the implementations of the disclosure, which is not repeated herein for brevity.

Figure 16:
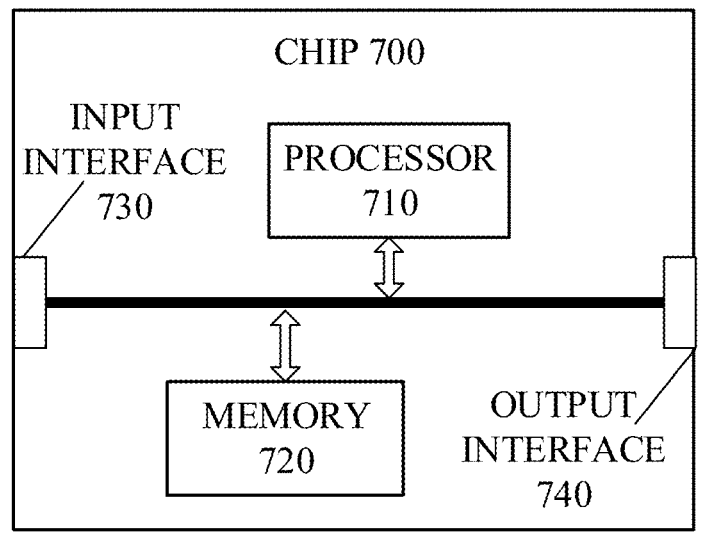
FIG. 16 is a schematic block diagram of a chip in implementations of the disclosure.

FIG. 16 is a schematic structural diagram of a chip 700 according to implementations of the disclosure. The chip 700 includes a processor 710, and the processor 710 can invoke and run a computer program from a memory to implement any of the methods in the implementations of the disclosure.

Optionally, the chip 700 may further include a memory 720. The processor 710 may invoke and run a computer program from the memory 720 to implement any of the methods in the implementations of the disclosure.

The memory 720 may be a separate component independent of the processor 710, or may be integrated in the processor 710.

Optionally, the chip 700 may further include an input interface 730. The processor 710 may control the input interface 730 to communicate with other devices or chips, specifically, to obtain information or data sent by other devices or chips.

Optionally, the chip 700 may further include an output interface 740. The processor 710 can control the output interface 740 to communicate with other devices or chips, specifically, to output information or data to other devices or chips.

Optionally, the chip can be applied to the network device in the implementations of the disclosure, and the chip can implement the corresponding processes implemented by the network device in each method of the implementations of the disclosure, which is not repeated herein for brevity.

Optionally, the chip can be applied to the terminal device in the implementations of the disclosure as illustrated in FIG. 12 or FIG. 14, and the chip can implement the corresponding processes implemented by the terminal device in each method of the implementations of the disclosure, which is not repeated herein for brevity.

It should be understood that the chip mentioned in the implementations of the disclosure may also be referred to as a system-on-chip, a system chip, a chip system, or the like.

The processor mentioned above may be a general-purpose processor, a digital signal processor (DSP), a field programmable gate array (FPGA), an application specific integrated circuit (ASIC), or other programmable logic devices, transistor logic devices, discrete hardware components, etc. The general-purpose processor mentioned above may be a microprocessor or any conventional processor or the like.

The memory mentioned above may be either transitory memory or non-transitory memory, or may include both transitory and non-transitory memory. The non-transitory memory may be read-only memory (ROM), programmable read-only memory (PROM), erasable programmable read-only memory (EPROM), electrically programmable Erase programmable read-only memory (electrically EPROM, EEPROM) or flash memory. The transitory memory may be random access memory (RAM).

It should be understood that the above-mentioned memory is an example but not a limitative description. For example, the memory in implementations of the disclosure may also be a static random access memory (static RAM, SRAM), a dynamic random access memory (dynamic RAM, DRAM), synchronous dynamic random access memory (synchronous DRAM, SDRAM), double data rate synchronous dynamic random access memory (double data rate SDRAM, DDR SDRAM), enhanced synchronous dynamic random access memory (enhanced SDRAM, ESDRAM), synchronous connection Dynamic random access memory (synch link DRAM, SLDRAM) and direct memory bus random access memory (Direct Rambus RAM, DR RAM) and so on. That is, the memory in the implementations of the disclosure is intended to include but not limited to these and any other suitable types of memory.

Figure 17:
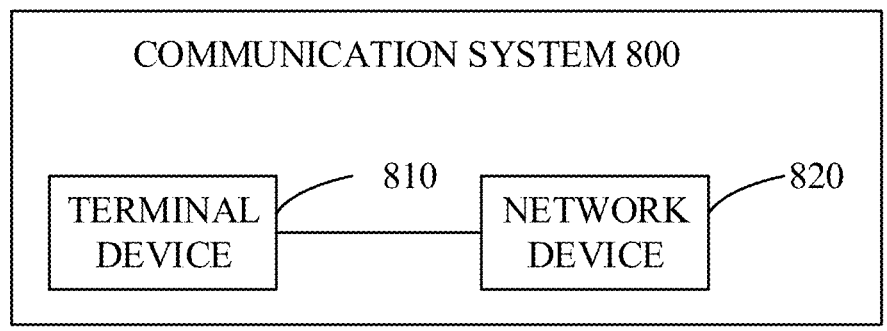
FIG. 17 is a schematic block diagram of a communication system in implementations of the disclosure.

FIG. 17 is a schematic block diagram of a communication system 800 according to implementations of the disclosure, where the communication system 800 includes a terminal device 810 and a network device 820.

The terminal device 810 may be configured to implement the corresponding functions implemented by the terminal device in any of the methods of the implementations of the disclosure, and the network device 820 may be configured to implement the corresponding functions implemented by the network device in any of the methods of the various implementations of the disclosure, which are not repeated herein for brevity.

The above-mentioned implementations may be implemented in whole or in part by software, hardware, firmware or any combination thereof. When implemented in software, the implementations can be implemented in whole or in part in the form of a computer program product. The computer program product includes one or more computer instructions. When the computer program instructions are loaded and executed on a computer, all or part of the processes or functions described in the implementations of the disclosure are generated. The computer may be a general purpose computer, a special purpose computer, a computer network, or other programmable device. The computer instructions may be stored on or transmitted from one computer-readable storage medium to another computer-readable storage medium, for example, the computer instructions may be transmitted over a wire from a website site, computer, server or data center (such as coaxial cable, optical fiber, digital subscriber line (DSL)) or wireless (such as infrared, wireless, microwave, etc.) to another website site, computer, server or data center. The computer-readable storage medium can be any available medium that can be accessed by a computer or a data storage device such as a server, data center, etc. that includes one or more available media integrated. The available media may be magnetic media (such as floppy disks, hard disks, magnetic tapes), optical media (such as DVD), or semiconductor media (such as solid state disk (SSD)).

It should be understood that, in various implementations of the disclosure, the sequence numbers of the above-mentioned processes does not mean the sequence of execution, and the execution sequence of each process should be determined by its functions and internal logic, and should not constitute any limitation to the implementations of the disclosure.

Those skilled in the art can clearly understand that, for convenience and brevity of description, the specific working process of the above-described systems, devices, and units can refer to the corresponding processes in the foregoing method implementations, which will not be repeated herein.

The above are only specific implementations of the disclosure, but the protection scope of the disclosure is not limited thereto. Any person skilled in the art who is familiar with the technical scope disclosed in the disclosure can easily think of changes or substitutions covered within the scope of protection of this disclosure. Therefore, the protection scope of the disclosure shall be subject to the protection scope of the claims.

What is claimed is:

1. A method for configuring a sidelink (SL) feedback resource, comprising:

obtaining, by a first terminal device, resource pool configuration information, the resource pool configuration information comprising resource pool indication information of a transmission resource of a SL data channel and resource pool indication information of a transmission resource of a SL feedback channel;

wherein the SL data channel is for transmitting first SL data, and the SL feedback channel comprises a first-type SL feedback channel and a second-type SL feedback channel; and wherein the resource pool indication information of the transmission resource of the SL feedback channel comprises third indication information, and the third indication information is used for determining a number of transmissions of the SL feedback channel, wherein the number of transmissions is greater than or equal to one.

2. The method of claim 1, wherein the resource pool indication information of the transmission resource of the SL feedback channel comprises first SL feedback resource pool indication information, the first SL feedback resource pool indication information is used for determining a transmission resource of the first-type SL feedback channel, and the first-type SL feedback channel is associated with the first SL data.

3. The method of claim 2, wherein the first-type SL feedback channel is for carrying at least one of:

hybrid automatic repeat request-acknowledgement (HARQ-ACK) information, channel quality indicator (CQI) information, rank indicator (RI) information, pre-coding matrix indicator (PMI) information, beam information, reference signal index information, power adjustment information, or measurement information.

4. The method of claim 1, wherein the resource pool indication information of the transmission resource of the SL feedback channel comprises second SL feedback resource pool indication information, the second SL feedback resource pool indication information is used for determining a transmission resource of the second-type SL feedback channel, and the second-type SL feedback channel is associated with the first SL data.

5. The method of claim 4, wherein the second-type SL feedback channel comprises a first sequence, and SL feedback information corresponding to the first SL data is carried by the first sequence.

6. The method of claim 1, wherein the resource pool indication information of the transmission resource of the SL feedback channel comprises second indication information, and the second indication information is used for determining a number of transmission resources of the SL feedback channel, wherein the number of the transmission resources of the SL feedback channel is greater than or equal to one.

7. The method of claim 1, further comprising:
obtaining, by the first terminal device, fifth indication information; and
determining, according to the fifth indication information, to transmit the SL feedback information using the first-type SL feedback channel or the second-type SL feedback channel.

8. The method of claim 1, further comprising:
determining, by the first terminal device according to a number of bits of the SL feedback information, to transmit the SL feedback information using the first-type SL feedback channel or the second-type SL feedback channel.

9. The method of claim 1, further comprising:
determining, by the first terminal device according to a type of the SL feedback information, to transmit the SL feedback information using the first-type SL feedback channel or the second-type SL feedback channel.

10. A method for configuring a sidelink (SL) feedback resource, comprising:
transmitting, by a first communication device to a first terminal device, resource pool configuration information, the resource pool configuration information comprising resource pool indication information of a transmission resource of a SL data channel and resource pool indication information of a transmission resource of a SL feedback channel;
wherein the SL data channel is for transmitting first SL data, and the SL feedback channel comprises a first-type SL feedback channel and a second-type SL feedback channel; and
wherein the resource pool indication information of the transmission resource of the SL feedback channel comprises third indication information, and the third indication information is used for determining a number of transmissions of the SL feedback channel, wherein the number of transmissions is greater than or equal to one.

11. The method of claim 10, wherein the resource pool indication information of the transmission resource of the SL feedback channel comprises first SL feedback resource pool indication information, the first SL feedback resource pool indication information is used for determining a transmission resource of the first-type SL feedback channel, and the first-type SL feedback channel is associated with the first SL data.

12. The method of claim 11, wherein the first-type SL feedback channel is for carrying at least one of:
hybrid automatic repeat request-acknowledgement (HARQ-ACK) information, channel quality indicator (CQI) information, rank indicator (RI) information, pre-coding matrix indicator (PMI) information, beam information, reference signal index information, power adjustment information, or measurement information.

13. The method of claim 10, wherein the resource pool indication information of the transmission resource of the SL feedback channel comprises second SL feedback resource pool indication information, the second SL feedback resource pool indication information is used for determining a transmission resource of the second-type SL feedback channel, and the second-type SL feedback channel is associated with the first SL data.

14. The method of claim 13, wherein the second-type SL feedback channel comprises a first sequence, and SL feedback information corresponding to the first SL data is carried by the first sequence.

15. The method of claim 10, wherein the resource pool indication information of the transmission resource of the SL feedback channel comprises second indication information, and the second indication information is used for determining a number of transmission resources of the SL feedback channel, wherein the number of the transmission resources of the SL feedback channel is greater than or equal to one.

16. The method of claim 10, further comprising:
transmitting, by the first communication device, fifth indication information, wherein the fifth indication information is used for the first terminal device to determine to transmit the SL feedback information using the first-type SL feedback channel or the second-type SL feedback channel.

17. A terminal device, comprising:
a processor; and
a memory for storing a computer program which, when executed by the processor, causes the processor to:
obtain resource pool configuration information, the resource pool configuration information comprising resource pool indication information of a transmission resource of a SL data channel and resource pool indication information of a transmission resource of a SL feedback channel;
wherein the SL data channel is for transmitting first SL data, and the SL feedback channel comprises a first-type SL feedback channel and a second-type SL feedback channel; and
wherein the resource pool indication information of the transmission resource of the SL feedback channel comprises third indication information, and the third indication information is used for determining a number of transmissions of the SL feedback channel, wherein the number of transmissions is greater than or equal to one.

18. The terminal device of claim 17, wherein the resource pool indication information of the transmission resource of the SL feedback channel comprises first SL feedback resource pool indication information, the first SL feedback resource pool indication information is used for determining a transmission resource of the first-type SL feedback channel, and the first-type SL feedback channel is associated with the first SL data.

\* \* \* \* \*